(12) United States Patent
Watanabe et al.

(10) Patent No.: US 7,790,078 B2
(45) Date of Patent: Sep. 7, 2010

(54) PROCESS FOR PRODUCING SILICA GLASS PRODUCT

(75) Inventors: Hiroyuki Watanabe, Koriyama (JP); Akira Fujinoki, Koriyama (JP); Takayuki Imaizumi, Koriyama (JP); Kazuhisa Hayakawa, Joetsu (JP); Shingo Niinobe, Joetsu (JP)

(73) Assignees: Shin-Etsu Quartz Products Co., Ltd., Tokyo (JP); Shin-Etsu Chemical Co., Ltd., Tokyo (JP)

( * ) Notice: Subject to any disclaimer, the term of this patent is extended or adjusted under 35 U.S.C. 154(b) by 124 days.

(21) Appl. No.: 11/795,567

(22) PCT Filed: Feb. 9, 2006

(86) PCT No.: PCT/JP2006/002267

§ 371 (c)(1), (2), (4) Date: Jul. 17, 2007

(87) PCT Pub. No.: WO2006/085591

PCT Pub. Date: Aug. 17, 2006

(65) Prior Publication Data

US 2008/0164631 A1    Jul. 10, 2008

(30) Foreign Application Priority Data

Feb. 14, 2005  (JP)  ............................. 2005-035501
Jun. 28, 2005  (JP)  ............................. 2005-188420

(51) Int. Cl.
*C03B 8/00*  (2006.01)

(52) U.S. Cl. ........................... 264/177.11; 264/328.18; 264/571; 65/17.2; 65/32.1

(58) Field of Classification Search ............ 264/177.11, 264/328.18, 571; 65/17.2, 32.1
See application file for complete search history.

(56) References Cited

U.S. PATENT DOCUMENTS 4,551,295 A * 11/1985 Gardner et al. ......... 264/177.11

FOREIGN PATENT DOCUMENTS

| JP | 59-30761 | | 2/1984 |
|---|---|---|---|
| JP | 60-239207 | | 11/1985 |
| JP | 61-94702 | | 5/1986 |
| JP | 1-150501 | | 6/1989 |
| JP | 01-150501 A | * | 6/1989 |
| JP | 4-65328 | | 3/1992 |
| JP | 4-349130 | | 12/1992 |
| JP | 04-349130 A | * | 12/1992 |
| JP | 6-65608 | | 3/1994 |
| JP | 7-138077 | | 5/1995 |
| JP | 10-29836 | | 2/1998 |
| JP | 2004-203639 | | 7/2004 |
| JP | 2005-139018 | * | 6/2005 |

* cited by examiner

*Primary Examiner*—Khanh Nguyen
*Assistant Examiner*—Saeed M Huda
(74) *Attorney, Agent, or Firm*—Jordan and Hamburg LLP

(57) ABSTRACT

A process for producing a transparent or opaque silica glass product including mixing a silica fine powder and a cellulose derivative and injection molding the mixture, followed by degreasing treatment and baking treatment, which is characterized in that the cellulose derivative is a cellulose derivative which causes reversible thermal gelation in an aqueous solution of at least one member selected from methyl cellulose, hydroxypropylmethyl cellulose and hydroxyethylmethyl cellulose; in producing a transparent silica glass product, the cellulose derivative is added in water heated at a gelation temperature thereof or higher, and after cooling, the formed aqueous solution is kneaded with the silica fine powder; and in producing an opaque silica glass product, the cellulose derivative is added in a silica slurry containing a silica powder and heated at a gelation temperature of the cellulose derivative or higher.

13 Claims, No Drawings

PROCESS FOR PRODUCING SILICA GLASS PRODUCT

TECHNICAL FIELD

The present invention relates to a process for producing a transparent silica glass product having a relatively complicated shape such as semiconductor manufacturing jigs and optical part and an opaque silica glass product which is used for a heat insulator for semiconductor industry or the like in a high purity with high precision at a low price.

BACKGROUND ART

In producing a transparent silica glass product with high precision having a relatively complicated shape and made of a silica glass or a bubble-containing opaque silica glass product, there have hitherto been employed a method for welding a member having a simple shape by fire working and assembling it; a method for working a silica glass bulk body by employing a mechanical working technology; a method for carrying out cast molding; a method for carrying out press molding under reduced pressure; a method for thermally foaming ammonified amorphous silica; and the like. However, in the foregoing assembling method by welding, there were involved problems that almost all of steps are manually carried out so that very experience and skill and time are required; and further that sag is generated in end parts because of a high temperature generated at the time of fire working, whereby the appearance is hindered.

Also, in the mechanical working technology, cutting working using a grindstone or the like is carried out. Since the silica glass is a brittle material with high hardness, there were involved problems that it takes a very long time; and breakage, strain, distortion, and the like are frequently generated, thereby reducing a yield of a final product and shortening a life of a product. Furthermore, in the cast molding method, there were involved problems that since a quartz glass exhibits a high viscosity as 5 or more in terms of (log $\eta$) even at 2,000° C., an apparatus to be used at the time of baking is expensive; that even by using a carbonaceous material, it reacts with the silica glass at a high temperature and is remarkably consumed, it must be frequently exchanged; and further that the surface state of the resulting product is so bad that the surface must be largely removed by cutting or polishing working, resulting in an increase of the costs. In the method for carrying out press molding, the same problems were caused, too. In particular, in producing an opaque silica glass product, since a bubble size of the opaque silica glass replies upon a particle gap at the time of molding, namely particle size distribution or filling density, according to the foregoing production method, it was difficult to control the bubble size, whereby an opaque silica glass product having a relatively complicated shape and having a desired bubble size could not be obtained.

As a method for overcoming the foregoing problems and producing a silica glass product having a relatively complicated shape at a low price in a high purity with good precision, there is proposed an injection molding method described in, for example, Patent Document 1. Also, as a production example of an opaque silica glass product, there is enumerated a method described in, for example, Patent Document 2. According to the production method described in the foregoing patent document 1, a silica glass powder and a binder and a plasticizer which is added as the need arises are kneaded, and the mixture is injection molded under heating, degreased and vitrified to produce a silica glass product. However, there were involved problems that the amount of the binder to be used is large as from 10 to 70 parts by mass based on 100 parts by mass of the silica glass powder and shrinkage of a silica glass molded article occurs at the time of baking, whereby the generation of deformation or a crack is easy to occur; and that since the injection molding is carried out at a high temperature, the binder degenerates during molding and remains in the silica glass molded article, thereby contaminating the silica glass product. Also, according to the production method described in the foregoing Patent Document 2, there were involved drawbacks that an opaque silica glass having a desired bubble size is not obtained; and that the resulting product is limited to a molded article in an ingot form, a lot of steps are required for the purpose of obtaining a product having a complicated shape therefrom, and the production costs are high.

Patent Document 1: JP-A-4-349130, JP-A-2004-203639
Patent Document 2: JP-A-4-65328, JP-A-10-29836

The invention is concerned with a process for producing a silica glass product which has solved the foregoing problems; and a first object thereof is to provide a process for producing a transparent silica glass product having a relatively complicated shape in a high purity with high precision at a low price.

Also, a second object of the invention is to provide a process for producing an opaque silica glass product having a desired bubble size and having a relatively complicated shape in a high purity at a low price.

DISCLOSURE OF THE INVENTION

In the case of producing a transparent silica glass product of the invention, a cellulose derivative which causes reversible thermal gelation is mixed with heated water and cooled to obtain an aqueous solution of the foregoing cellulose derivative, which is then mixed with a silica fine powder; and the mixture is filled in a cylinder of an injection molding machine and injection molded in a heated molding die, followed by mold release, degreasing treatment, purification treatment and baking treatment under reduced pressure to fabricate a silica glass product. On the other hand, in the case of producing an opaque silica glass product, for the purpose of making a cellulose derivative particle remain in a silica glass molded article, a silica slurry containing a silica fine powder and water is heated at a gelation temperature of a cellulose derivative aqueous solution or higher and then mixed with a cellulose derivative powder; the mixture is cooled to dissolve the cellulose derivative powder and adjust its particle size to a desired size; and the resulting mixture is filled in a cylinder of an injection molding machine and injection molded in a heated molding die, followed by mold release, degreasing treatment, purification treatment and baking treatment to fabricate an opaque silica glass product.

In the foregoing process for producing a silica glass product, by using a cellulose derivative which causes reversible thermal gelation, its blending amount can be reduced; the generation of deformation or a crack on the basis of the shrinkage of a silica glass molded article at the time of baking can be prevented; the injection molding can be carried out at a low temperature; and a degreasing time of the cellulose derivative can be shortened. Furthermore, the incorporation of impurities into the product caused dues to the foregoing cellulose derivative can be prevented, and a transparent silica glass product with high precision can be produced in a relatively complicated shape with high purity at a low price. On the other hand, by mixing a cellulose derivative powder in a silica slurry containing a heated silica fine powder and water, the particle size of the cellulose derivative powder in the silica glass molded article can be adjusted at an arbitrary size, and an opaque silica glass product having a desired bubble size and having a relatively complicated shape can be produced at a low price.

As the silica fine powder which is used in the foregoing production process, a natural silica fine powder, a synthetic silica fine powder, and the like are used, and it is desirable that its particle size falls within the range of from 0.1 to 20 μm. The shape is preferably spherical. When the silica fine particle is spherical, the filling is minutely carried out, whereby a firm molded article can be formed. In particular, it is preferable that the silica fine powder is a spherical synthetic silica fine powder. The synthetic silica fine powder contains a lot of hydrophilic silanol groups on its surface, and when mixed with water, the silanol groups on the surface of the silica fine powder mutually cause hydrogen bonding, whereby the silica fine powder forms a three-dimensional network structure. Also, they cause hydrogen bonding with a hydroxyl group in an unsubstituted state of the cellulose derivative of the binder to be blended, whereby a firm silica glass molded article can be produced, and treatments in subsequent steps become easy. When the particle size of the silica fine powder is less than 0.1 μm, the viscosity becomes high, whereby not only kneading with the binder is difficult, but also a sintered body with high strain or internal stress is formed because of its excessively high sintering activity. Also, what the particle size exceeds 20 μm is not preferable because a surface of an injection molding machine or a molding die is abraded, and abrasion scums are incorporated into the silica glass molded article, thereby contaminating the silica glass product. Also, for the purpose of producing a satisfactory amorphous silica glass product, it is desirable that the silica fine power has the content of an alkali metal, an alkaline earth metal and iron which are cause of the crystallization of not more than 50 ppm.

As the cellulose derivative, a cellulose derivative which causes reversible thermal gelation is used. Concretely, at least one member selected from methyl cellulose, hydroxypropylmethyl cellulose and hydroxyethylmethyl cellulose is enumerated. It is desirable that a 2% by mass aqueous solution containing the foregoing cellulose derivative which causes reversible thermal gelation has 100 mPa·s or more, and preferably 30,000 mPa·s or more at 20° C. Thus, even when its blending amount is low in mixing with the silica fine powder, it is possible to keep moldability satisfactory. It is desirable that a blending amount of the cellulose derivative is in the range of from 0.1 to 10% by mass, and preferably from 0.1 to 5% by mass based on the silica fine powder. When the blending amount is less than 0.1% by mass, sufficient moldability cannot be kept. On the other hand, what it exceeds 10% by mass is not preferable because a degree of shrinkage at the time of baking becomes large, thereby generating deformation or a crack on the silica glass product. The foregoing viscosity of the cellulose derivative aqueous solution is a value measured as a 2% by mass aqueous solution at 20° C. by using an Ubbelohde's viscometer No. 5 as specified in JIS K2283-1993. In addition to this cellulose derivative, fluidity may be enhanced by further adding a plasticizer such as fatty acids, e.g., stearic acid, ethylene glycol, glycerin or adducts of ethylene oxides and a fatty acid thereof, and higher alcohols, e.g., stearic alcohol as the need arises.

BEST MODES FOR CARRYING OUT THE INVENTION

With respect to the process for producing a silica glass product according to the invention, in the production process of a transparent silica glass product, a silica fine powder and a cellulose derivative which causes reversible thermal gelation are kneaded, and the mixture is injection molded at a low temperature, followed by mold release, degreasing treatment, purification treatment and transparentization by baking, whereby a silica glass product having a relatively complicated shape can be produced with high precision at a low cost. A cellulose derivative powder is completely dissolved in water in advance to prepare an aqueous solution, which is then blended with a silica fine powder. In preparing a cellulose derivative aqueous solution, it is necessary to prevent cohesion from occurring by adding the cellulose derivative powder in warm water heated at a temperature at which the cellulose derivative aqueous solution is gelled or higher step-by-step while stirring. The aqueous solution having a cellulose derivative thoroughly dissolved therein is cooled and then allowed to stand for a sufficient time such that an undissolved residue doest not exist. Preferably, it is desirable that the aqueous solution having a cellulose derivative dissolved therein is put in a refrigerator or the like and kept at not higher than 5° C. The silica fine powder is added in the cooled cellulose derivative aqueous solution and kneaded by a three-roll mill, a kneader or the like. When kneading is insufficient, not only shape retention becomes worse in a green body, but also unevenness is generated in a kneaded material of the silica fine powder and the cellulose derivative, thereby forming a strong portion and a weak portion. After all, a crack or the like is generated from the weak portion. The resulting kneaded material is fed from a raw material feed port of an injection molding machine while keeping it in a cooled state and injected into a resin-made or metal-made molding die heated at from 70 to 120° C., and preferably from 90 to 110° C. When the kneaded material is injected into the molding die having the foregoing temperature range, gelation and evaporation of the moisture occur, thereby forming a thin film along a surface of the contacted molding die. The kneaded material passes through this thin layer and flows into an end portion of the molding die. However, when the temperature of the molding die exceeds 120° C., since the moisture is abruptly evaporated, the kneaded material is solidified in the vicinity of an injection port of the molding die, whereby a passage into which it should have flown is closed. On the other hand, when the temperature of the molding die is lower than 70° C., not only the center of the molded article is hardly gelled, but also it takes a long time to evaporate the moisture so that a long time for extracting the molded article is necessary, and a warp of the extracted molded article may possibly occur. After the injection, the molded article is kept for from 10 to 60 seconds as it stands, and the moisture is thoroughly evaporated, followed by mold release. However, the evaporation of water is enough to such an extent that the molded article keeps a necessary strength during the mold release, but it is not necessary to remove completely the water. It is desirable that a mold releasing agent such as silicone oil is previously applied onto the molding die, thereby making it easy to achieve mold release. The injection molded silica glass molded article is then subjected to degreasing treatment at from 300 to 1,000 for from 1 to 10 hours, thereby removing the cellulose derivative contained in the molded article. More preferably, the molded article is heated in an air atmosphere at a temperature rise rate of from 1 to 5° C./min, and when the heating temperature reaches 500° C., the molded article is kept at that temperature for from 3 to 6 hours. Since the condition of this degreasing treatment varies depending upon the size and shape of the silica glass molded article and the kind of the binder, and a condition adaptive with such requirements may be properly chosen. After the foregoing degreasing treatment, the resulting molded article is cooled to room temperature and then subjected to purification treatment in a chlorine atmosphere at from 500 to 1,300° C. for from 0.5 to 5 hours. What a lot of impurities, especially alkali metals and alkaline earth metals are contained is not preferable because transition into cristobalite occurs at the time of baking, thereby causing breakage or chipping of the silica glass product due to a crack or generation of irregularities due to a fine crack on the surface. The silica glass molded article is then baked at a temperature of from 1,200 to 1,700° C. and converted into a transparent glass. The baking is preferably carried out under a reduced pressure of less than 13.3 Pa. In the case where the particle size of the silica fine powder is from 0.1 to 2 µm, transparentization can be carried out by baking under atmospheric pressure. Also, in baking, in the case where the thickness of the silica glass molded article is large, it is desired to employ a high baking temperature of from 1,500 to 1,700° C.

In producing the foregoing transparent silica glass product, preliminary sintering for heating in an oxidization atmosphere of from 800 to 1,000° C. may be carried out prior to the baking treatment. Thus, not only handling of the silica glass molded article becomes easy, but also foreign substances caused due to the residual cellulose derivative are removed.

In the production process of an opaque silica glass product, it is desirable that a silica slurry containing a silica fine powder and water is heated at a gelation temperature of a cellulose derivative aqueous solution or higher; a cellulose derivative powder is added and mixed therein step-by-step while stirring such that cohesion is not caused; and the mixture is cooled and dissolved such that a particle size of the cellulose derivative powder becomes a desired size. A cooling temperature is not higher than 45° C., and preferably not higher than 10° C., and cooling is carried out for a time in the range of from 1 to 120 minutes. By properly choosing the cooling temperature and/or the cooling time within this range, an opaque silica glass product having a desired bubble size is obtained. When the temperature is higher than the foregoing range, the cellulose derivative is not dissolved, thereby possibly bringing the case where it cannot be dissolved to a desired particle size. Also, when the dissolution time is short, the dissolution is not sufficiently carried out. Furthermore, when a dissolution time of the foregoing range or more is employed, the dissolution proceeds excessively by cooling, whereby it is difficult to adjust the particle size at a desired size. The cooled mixture is then injected into a resin-made or metal-made molding die heated at from 70 to 120° C., and preferably from 90 to 110° C. and molded. After molding, mold release and degreasing treatment are carried out, and the cellulose derivative is burnt to form pores in a silica glass molded article. In particular, for the purpose of obtaining a silica glass product having high heat resistance, it is desirable that not only the amount of addition of the cellulose derivative is increased, but also its dissolution amount is limited, thereby making the cellulose derivative remain in the silica glass molded article while keeping the particle size large. The silica glass slurry containing a cellulose derivative powder is gelled within the molding die, and the moisture is evaporated, thereby forming it into a firm molded article. The evaporation of water is enough to such an extent that the molded article keeps a necessary strength during the mold release, but it is not necessary to remove completely the water.

The foregoing degreasing treatment is carried out in an air atmosphere at a temperature of from 300 to 900° C. at a temperature rise rate of from 1 to 5° C./min, and when the temperature reaches the foregoing range, the molded article is kept for from 3 to 6 hours. After completion of degreasing treatment, the resulting molded article is cooled to room temperature.

After the degreasing treatment, the silica molded article which has been cooled to room temperature is provided for purification treatment. It is desirable that this purification treatment is carried out in a chlorine atmosphere at from 500 to 1,300° C. for from 0.5 to 5 hours. What the silica glass molded article contains a lot of impurities, especially alkali metals and alkaline earth metals is not preferable because transition into cristobalite occurs at the time of vitrification of the molded article, thereby causing breakage or chipping of the silica glass product due to a crack or generation of irregularities due to a fine crack on the surface.

The purified silica glass molded article is then baked at a temperature of from 1,200 to 1,700° C. for from 5 to 30 minutes. More preferably, heating is carried out under reduced pressure. A bubble-free silica glass layer of from 0.1 to 2 mm is formed on a surface of the silica glass molded article by baking treatment under reduced pressure, whereby a satisfactory opaque silica glass product can be produced without carrying out surface smoothening treatment such as grinding and polishing. For the formation of the foregoing bubble-free silica glass layer, it is desired to use a silica fine powder having a small particle size. Concretely, when the particle size of the silica fine powder is 0.5 µm, a bubble-free silica glass layer of 0.5 mm is formed; when the particle size is 1 µm, a bubble-free silica glass layer of 0.3 mm is formed; and when the particle size is 25 µm, a bubble-free silica glass layer of 0.08 mm is formed, respectively.

In producing the foregoing opaque silica glass product, for the purpose of improving dispersibility of the silica particle of the silica slurry, it is desired to add a dispersant, a pH adjustor, or the like in advance prior to heating and further to disperse the mixture for several days by a ball mill. Also, what the silica slurry containing a cellulose derivative is gelled within a molding die and the mixture is evaporated to form a firm molded article is preferable because handing in subsequent steps becomes easy. The foregoing evaporation of water is enough to such an extent that the molded article keeps a necessary strength during the mold release, but it is not necessary to remove completely the water.

The invention is specifically described below, but it should not be construed that the invention is limited thereto.

EXAMPLES

Example 1

10% by mass methyl cellulose (viscosity of 2% by mass aqueous solution: 4,000 mPa·s) was added in pure water heated at 70° C. and stirred for about 10 minutes. Subsequently, the mixture was cooled with ice together with a container, thereby advancing dissolution of the methyl cellulose fine powder; and the resulting mixture was further allowed to stand overnight in a refrigerator of not higher than 5° C. together with the container, thereby obtaining a uniform aqueous solution. Small amounts of a spherical silica fine powder having an average particle size of 0.5 µm and an ethylene glycol plasticizer were added in this methyl cellulose aqueous solution, and the mixture was kneaded by a roll mill, followed by degassing under reduced pressure. A concentration of the silica fine powder was 85% by mass, and a concentration of methyl cellulose against this silica fine powder was 2% by mass. The foregoing kneaded material in a cooled state was filled in an injection cylinder of a simplified small-sized injection molding machine, injected into a molding die heated at 95° C. and kept for about 30 seconds, followed by mold release, thereby obtaining a plate of 15 millimeters long, 100 across and 5 high.

The foregoing molded article was heated to 500° C. at a temperature rise rate of 3° C/min in an air atmosphere and kept at that temperature for 6 hours, thereby achieving degreasing treatment. Next, the resulting molded article was heated in a hydrogen chloride atmosphere at 1,200° C. for 2 hours to remove impurities, followed by baking under a reduced pressure of 1 Pa at 1,500° C. for 10 minutes, thereby obtaining a transparent silica glass plate. In this silica glass plate, deformation or a crack was not observed, and a percent defective of precision was 9%.

Example 2

An aqueous solution was prepared in the same manner as in Example 1, except that in Example 1, methyl cellulose having a viscosity of 30,000 mPa·s in terms of a 2% by mass aqueous solution thereof was used; a silica fine powder was mixed therein such that a concentration of methyl cellulose was 0.5% by mass; a small amount of an ethylene glycol plasticizer was added therein; and the mixture was kneaded by a roll mill. The resulting kneaded material in a cooled state was filled in an injection molding machine and injected into a molding die at 95° C. in the same manner as in Example 1. After about 30 seconds, the molded article was mold released, thereby obtaining a plate of 15 millimeters long, 100 across and 5 high. The resulting plate was heated to 500° C. at a temperature rise rate of 3.5° C./min in an air atmosphere and kept at that temperature for 3 hours, thereby achieving degreasing treatment. Next, the resulting plate was heated in a hydrogen chloride atmosphere at 1,200° C. for 2 hours to remove impurities, followed by baking under a reduced pressure of 1 Pa at 1,500° C. for 10 minutes, thereby obtaining a transparent silica glass product. In the subject silica glass plate, deformation or a crack was not observed, and a percent defective of precision was 3%.

Comparative Example 1

To a spherical silica fine powder having an average particle size of 0.5 μm, an acrylic resin was added in an amount of 40% by mass based on the silica fine powder; a small amount of an ethylene glycol plasticizer was further added; and the mixture was kneaded by a kneader, followed by degassing under reduced pressure and granulation. The subject granulated material was filled in a simplified small-sized injection machine heated at about 200° C. and injected into a molding die at room temperature. After about 3 minutes, the molded article was mold released, thereby obtaining a plate of 15 millimeters long, 100 across and 5 high. This molded article was heated to 500° C. at a temperature rise rate of 0.5° C./min in an Air atmosphere and kept at that temperature for 100 hours, thereby achieving degreasing treatment. Next, the resulting molded article was heated in a hydrogen chloride atmosphere at 1,200° C. for 2 hours to remove impurities, followed by baking under a reduced pressure of 1 Pa at 1,500° C. for 10 minutes, thereby obtaining a transparent silica glass plate. In the subject silica glass plate, deformation or a crack was not observed, and a percent defective of precision was 25%.

Example 3

A silica powder having an average particle size of 0.5 μm was added in pure water heated at 70° C. while stirring, thereby preparing a slurry so as to have a solids concentration of silica of 80% by mass. A methyl cellulose powder (having a viscosity of 4,000 mPa·s at 2% by mass) was added in an amount of 2% by mass based on this silica mass, and the mixture was thoroughly stirred and dispersed. After cooling this to 40° C., the foregoing mixture was transferred into an injection cylinder and cooled at 5° C. for 10 minutes. This mixture in a cooled state was injected into a molding die which had been previously heated at 90° C. and kept for about 30 seconds, followed by molding releasing, thereby obtaining a plate of 15 millimeters long, 100 across and 5 high. The resulting molded article was increased in temperature to 500° C. at 3° C./min in an air atmosphere and kept at that temperature for 6 hours, thereby achieving degreasing treatment. Next, the resulting molded article was heated in a hydrogen chloride atmosphere at 1,200° C. for 2 hours to remove impurities. The molded article after the purification treatment was baked under 13.3 Pa at 1,500° C. for 10 minutes, thereby obtaining a bubble-containing silica glass plate having a 0.5 mm-thick transparent layer on a surface of the baked body. This silica glass plate had an average bubble size of 45.6 μm and a bubble content, as expressed in terms of a total bubble volume ratio per 1 mm$^3$, of 0.31. Also, a silanol concentration was less than 10 ppm.

Example 4

An opaque silica glass product having a 0.5 mm-thick transparent layer on a surface of a sintered body was obtained in the same production method as in Example 3, except for changing the cooling time to one hour. The foregoing silica glass plate had an average bubble size of 29.4 μm and a bubble content, as expressed in terms of a total bubble volume ratio per 1 mm$^3$, of 0.12. Also, a silanol concentration was less than 10 ppm.

INDUSTRIAL APPLICABILITY

According to the production process of the invention, it is possible to provide a transparent silica glass product having a relatively complicated shape such as semiconductor manufacturing jigs and optical part, and an opaque silica glass product which is used for a heat insulator for thermal treatment or the like, in a high purity with high precision at a low price with good productivity.

The invention claimed is:

1. A process for producing a transparent silica glass product comprising the steps of:
    combining a silica fine powder with an aqueous solution of a cellulose derivative that causes reversible gelation in aqueous solution to obtain a combination, wherein the solution of the cellulose derivative is obtained by combining the cellulose derivative that causes reversible gelation in aqueous solution with water at or above a gelation temperature followed by cooling the combination in an environment maintained at a temperature not greater than 5° C. for about 1 to about 120 minutes;
    kneading the resulting combination;
    injection molding the kneaded combination in a molding die to form a molded silica article;
    sequentially subjecting the molded silica article to a degreasing treatment, a purification treatment, and a baking treatment to obtain the transparent silica glass product.

2. The process for producing a silica glass product according to claim 1, wherein the silica fine powder comprises a synthetic silica fine powder.

3. The process for producing a silica glass product according to either of claim 1 or 2, wherein the cellulose derivative that causes reversible thermal gelation in an aqueous solution includes at least one cellulose derivative selected from the group consisting of methyl cellulose, hydroxypropylmethyl cellulose and hydroxyethylmethyl cellulose.

4. The process for producing a silica glass product according to claim 3, wherein the cellulose derivative that causes reversible thermal gelation in an aqueous solution is methyl cellulose.

5. The process for producing a silica glass product according to either of claim 1 or 2, wherein the cellulose derivative that causes reversible thermal gelation in an aqueous solution has a viscosity in a 2% by mass aqueous solution of 100 mPa·s or more.

6. The process for producing a silica glass product according to claim 5, wherein the cellulose derivative that causes reversible thermal gelation in an aqueous solution has a viscosity in a 2% by mass aqueous solution of 30,000 mPa·s or more.

7. The process for producing a silica glass product according to either of claims 1 or 2, wherein a blending amount of the cellulose derivative is in the range of from 0.1 to 10% by mass based on the silica fine powder.

8. The process for producing a silica glass product according to claim 1, wherein the molding die is maintained at a temperature of 70° to 120° C.

9. The process for producing a silica glass product according to claim 1, wherein the baking treatment is carried out by heating the molded silica article at a temperature of 1,200° to 1,700° C. at reduced pressure.

10. The process for producing a silica glass product according to claim 1, wherein the degreasing treatment is carried out at a temperature of from 300 to 1,000° C. for from 1 to 10 hours in air.

11. The process for producing a silica glass product according to either of claims 1 or 9, wherein a bubble-free silica glass layer of 0.1 mm or more is formed on a surface of the silica glass product.

12. The process for producing a transparent silica glass product of claim 1 wherein the degreasing treatment includes the steps of heating the injection molded silica article to a temperature of 500° C. at a heating rate of 1° to 5° C./min and maintaining the heated injection moldied silica article at that temperature for 3 to 6 hours.

13. The process for producing a transparent silica glass product of claim 9 wherein the reduced pressure is a pressure of 1 to 13.3 Pa.

* * * * *